UNITED STATES PATENT OFFICE 2,637,731

IMIDAZOPYRIDINES

James R. Vaughan, Jr., Stamford, Conn., assignor to American Cyanamid Company, New York, N. Y., a corporation of Maine No Drawing. Application June 2, 1949, Serial No. 96,817

3 Claims. (Cl. 260—296)

This invention relates to new chemical compounds and to methods of preparing the same. More particularly, the invention relates to imidazopyridines and triazolopyridines.

I have found that imidazo- and triazolo-pyridines having the following structural formula

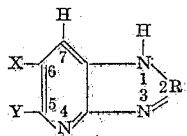

where R is N, C—OH and C—SH; X is a chlorine or hydrogen atom and when X is hydrogen, Y is an amino or acylamino group, are useful as therapeutic agents and as intermediates in the synthesis of pharmaceuticals. They are particularly useful in that they are structurally related to naturally occurring growth factors.

The compounds of the present invention are generally characterized as white to light yellow crystalline solids somewhat soluble in water but soluble to a greater extent in aqueous solutions of strong acids. In general, they are soluble in organic solvents commonly used to dissolve heterocyclic bases such as alcohol, ether and petroleum solvents. They form hydrohalide salts which are colorless and are readily soluble in water. The bases and the hydrohalide salts are characterized by high melting points.

The compounds of the present invention are analogs of the naturally occurring purines such as adenine, xanthene and guanine, and are useful in experimental medicine because of their effect on growth.

Since the halogen on the 6-position shows the same reaction properties as aromatically bound halogens, and the 5-amino and acylamino groups have similar properties to arylamines, these compounds are useful in preparing further purine analogs for experimental therapy as well as imidazo- and triazolo-pyridine dyestuffs. The chlorine can be replaced by amino, alkylamino, hydroxy, alkoxy, and alkali metal radicals and the amino groups can be similarly altered and modified to prepare hydroxy-alkyl and alkyl derivatives of these compounds for further useful purposes.

The common starting material for these compounds is 2,3-diaminopyridine having substituents thereon. The use of 5-chloro-2,3-diaminopyridine is most satisfactory since it is readily available. It is prepared by the nitration of 2-amino-5-chloropyridine followed by a hydrosulfite reduction to yield a pure product in contrast to the results obtained in the nitration and reduction of 2-aminopyridine. It was found that the 2,3-diamine resulting from the reduction is much more stable when the 5-chlorine atom is present.

To prepare the compounds of the imidazo-(b)pyridine series the 5-chloro-2,3-diaminopyridine is reacted with anhydrous formic acid, acetic acid, acetic anhydride, phosgene and thiophosgene. When reacted with nitrous acid the pyrido (2,3-d)-γ-triazole series results.

In the preparation of compounds where X is equal to hydrogen and Y is an amine or substituted amine group, 2,3,6-triaminopyridine is prepared in good yield by the catalytic reduction of 2,6-diamino-3-phenylazopyridine. The triaminopyridine is reacted with formic acid to give the 5-formylaminoimidazo(b)pyridine. The latter is deacylated to the 5-amino compound with hydrochloric acid. Acetic anhydride or any of the stronger alkylating agents can be used in place of the formic acid to yield 2-alkyl-5-acetylimidazo(b)pyridines. By substituting thiophosgene, phosgene or nitrous acid as in the 5-chloro-2,3-diaminopyridine series, it is possible to prepare 5-amino derivatives substituted at the 2-position by the following groups: C—OH, C—SH, N, etc.

The products are purified by recrystallization from aqueous solution; or by dissolving in an alkaline solution, treating with activated charcoal and neutralizing to precipitate the base; or by recrystallization from alcohol; or by conversion to the hydrohalide salt, neutralizing this salt by means of an alkali, extracting the heterocyclic base by means of a solvent, evaporating the solvent and concentrating the base until crystallization takes place.

The invention will now be illustrated in greater detail by means of the following specific examples in which representative intermediates and compounds are prepared. The compounds prepared and claimed hereinafter are named in accordance with the ring index system as outlined by Patterson and Capell, American Chemical Society Monograph #84. The parts are by weight unless otherwise specified.

EXAMPLE 1

*6-chloropyrido(2,3-d)-γ-triazole*

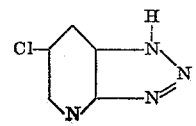

Five hundred parts of 2,3-diamino-5-chloropyridine was dissolved with warming in 15,000 parts of water containing 500 parts of concentrated sulfuric acid and the solution cooled to less than 10° C. A second solution containing 250 parts of sodium nitrite in 1,000 parts of cold water was then added with shaking. A yellow color developed immediately and the product separated rapidly as light yellow, crystalline needles. These were recrystallized from water (Norit) to yield 410 parts (76%) of material as colorless crystalline blades, melting point 166–167° C.

EXAMPLE 2

*2-hydroxy-6-chloroimidazo(b)pyridine*

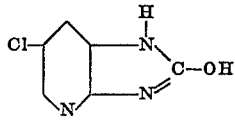

A slow stream of phosgene was passed into a solution of 500 parts of 2,3-diamino-5-chloropyridine in 1:1 hydrochloric acid at ice bath temperature for two hours to precipitate a crystalline phosgene adduct of the desired product. This was removed and decomposed by washing with water. The resulting granular product was recrystallized from 12,500 parts of glacial acetic acid as colorless needles. Yield: 273 parts (46%). An additional 100 parts (17%) of material was obtained by basifying the original acid filtrate and recrystallizing the resulting precipitate as above, melting point 338–340° C.

EXAMPLE 3

*2-thio-6-chloroimidazo(b)pyridine*

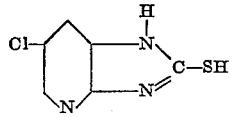

A mixture of 30 parts of 2,3-diamino-5-chloropyridine and 50 parts of thiophosgene in 600 parts of 1:1 hydrochloric acid was allowed to stand at room temperature for twenty-four hours. The crystalline precipitate which separated was washed with alcohol and dried. A satisfactory solvent for recrystallization was not found, but the material was purified in low yield by dissolving it in dilute ammonium hydroxide containing a trace of sodium hydrosulfite, treating the solution several times with Darco and reprecipitating the product with acetic acid. Melting point 352–354° C.

I claim:
1. The process of preparing compounds of the general formula

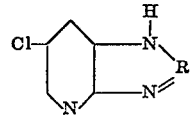

where R is chosen from the group consisting of C—OH and C—SH, which comprises intimately contacting and allowing to react 2,3-diamino-5-chloropyridine with a phosgene of the group consisting of phosgene and thiophosgene, and recovering the above stated compounds.

2. The process of preparing compounds of 2-hydroxy - 6 - chloroimidazo(b)pyridine which comprises intimately contacting and allowing to react 2,3-diamino-5-chloropyridine with phosgene at a temperature in the range −20° to 50° C., and recovering the 2-hydroxy - 6 - chloroimidazo(b)pyridine.

3. The process of preparing compounds of 2-thio-6-chloroimidazo(b)pyridine which comprises intimately contacting and allowing to react 2,3-diamino-5-chloropyridine with thiophosgene at a temperature in the range −20° to 50° C. and recovering the 2-thio-6-chloroimidazo(b)pyridine.

JAMES R. VAUGHAN, JR.

References Cited in the file of this patent

UNITED STATES PATENTS

| Number | Name | Date |
|---|---|---|
| 799,955 | Weber | Sept. 19, 1905 |

OTHER REFERENCES

Bernstein et al., Jour. Amer. Chem. Soc. 69, pp. 1151–1158 (1947).

Gogl et al., Chemical Abstracts, pp. 5018–5019 (1948), citing Rec. Trav. Chim. 67, pp. 29–44 (1948).